United States Patent
Alwan et al.

(10) Patent No.: US 9,367,861 B2
(45) Date of Patent: *Jun. 14, 2016

(54) TIMER-BASED AD PLACEMENT IN CONTENT RETRIEVAL APPLICATIONS

(71) Applicant: International Business Machines Corporation, Armonk, NY (US)

(72) Inventors: Charbel S. Alwan, Cary, NC (US); Fernando Barsoba, Durham, NC (US); David T. Britt, Greensboro, NC (US); Jason P. Hawrysz, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/826,577

(22) Filed: Mar. 14, 2013

(65) Prior Publication Data

US 2013/0211888 A1    Aug. 15, 2013

Related U.S. Application Data

(63) Continuation of application No. 13/250,048, filed on Sep. 30, 2011.

(51) Int. Cl.
*G06Q 30/00* (2012.01)
*G06Q 30/02* (2012.01)

(52) U.S. Cl.
CPC ........ *G06Q 30/0277* (2013.01); *G06Q 30/0241* (2013.01); *G06Q 30/0272* (2013.01)

(58) Field of Classification Search
CPC ........ G06Q 30/02; G06Q 30/41; G06Q 30/77
See application file for complete search history.

(56) References Cited

U.S. PATENT DOCUMENTS

| | | | |
|---|---|---|---|
| 6,161,127 A | 12/2000 | Cezar et al. | |
| 7,975,310 B2 * | 7/2011 | Hydrie et al. | 726/27 |
| 2006/0173743 A1 | 8/2006 | Bollay | |
| 2006/0277098 A1 * | 12/2006 | Chung et al. | 705/14 |
| 2007/0055986 A1 | 3/2007 | Gilley et al. | |
| 2007/0219949 A1 * | 9/2007 | Mekikian | 707/2 |
| 2007/0260674 A1 | 11/2007 | Shenfield | |
| 2007/0265918 A1 | 11/2007 | McMahon et al. | |
| 2008/0154951 A1 * | 6/2008 | Martinez et al. | 707/103 Y |
| 2008/0255943 A1 * | 10/2008 | Morten et al. | 705/14 |
| 2009/0076898 A1 * | 3/2009 | Wang et al. | 705/14 |

(Continued)

OTHER PUBLICATIONS

Chu, David et al, Technology Assessment: User-Created Content Hype, or sustainable business model?, Strategic Computing and Communications Technology, 2007, pp. 1-16, UC Berkeley, Berkeley, CA, United States.

(Continued)

*Primary Examiner* — Bennett Sigmond
*Assistant Examiner* — Christopher Stroud
(74) *Attorney, Agent, or Firm* — Patterson + Sheridan, LLP

(57) ABSTRACT

Techniques are described for incorporating advertisements into content in a content retrieval application. Embodiments receive a request to view content retrieved from source content containing one or more advertisements. In response to receiving the request, a timer is initiated. The timer is configured to expire after a period of time has elapsed. Embodiments determining whether to display any of the one or more advertisements, based upon whether the timer has expired.

7 Claims, 6 Drawing Sheets

(56) References Cited

U.S. PATENT DOCUMENTS

| | | | |
|---|---|---|---|
| 2009/0083279 A1* | 3/2009 | Hasek | 707/10 |
| 2009/0132373 A1 | 5/2009 | Redlich | |
| 2009/0248508 A1 | 10/2009 | Hamaoui et al. | |
| 2009/0254931 A1* | 10/2009 | Pizzurro et al. | 725/5 |
| 2010/0057576 A1* | 3/2010 | Brodersen et al. | 705/14.69 |
| 2010/0100446 A1* | 4/2010 | Kim | 705/14.64 |
| 2010/0131355 A1 | 5/2010 | Kitchen et al. | |
| 2010/0185674 A1* | 7/2010 | Jobs et al. | 707/781 |
| 2010/0223376 A1* | 9/2010 | Park et al. | 709/224 |
| 2010/0250349 A1 | 9/2010 | Zhan et al. | |
| 2010/0287580 A1* | 11/2010 | Harding et al. | 725/14 |
| 2010/0306039 A1 | 12/2010 | Green et al. | |
| 2012/0022943 A1* | 1/2012 | Howard et al. | 705/14.51 |
| 2012/0030010 A1* | 2/2012 | Krishnamoorthy et al. | 705/14.43 |

OTHER PUBLICATIONS

Wortham, Jenna, Apps Alter Reading on the Web, The New York Times, Feb. 1, 2011, p. B1, Arthur Ochs Sulzberger, Jr., New York, New York, United States.

U.S. Appl. No. 13/250,048, entitled Timer-Based Ad Placement in Content Retrieval Applications, filed Sep. 30, 2011.

* cited by examiner

TIMER-BASED AD PLACEMENT IN CONTENT RETRIEVAL APPLICATIONS

CROSS-REFERENCE TO RELATED APPLICATIONS

This application is a continuation of co-pending U.S. patent application Ser. No. 13/250,048, filed Sep. 30, 2011. The aforementioned related patent application is herein incorporated by reference in its entirety.

BACKGROUND

Embodiments presented in this disclosure generally relate to online advertising. More specifically, embodiments presented herein provide techniques for incorporating advertisements into a content retrieval application and ensuring proper revenue sharing between the parties involved.

Online advertising has become one of the most popular and effective ways of financially supporting online content. For instance, a popular website could sell advertising space on its various web pages to support the costs of running the website. Doing so may allow the website to avoid charging users to view its content, which may in turn allow the website to deliver its content to a wider audience. As an example, a news organization could post advertisements on its website along with news articles and could use the revenue from the advertisements to pay for web hosting fees and journalist salaries. By doing so, the news organization could offer its news articles to the public for effectively no out-of-pocket cost, allowing the news organization to market its news articles to a wider audience. However, due to the popularity of providing "free" content to the public using online advertising revenue, many members of the public have become reluctant to pay for certain online content. As such, content providers have become increasingly dependent on advertising revenue to maintain their online presence.

SUMMARY

Embodiments of the invention provide a computer-implemented method, system and computer program product for displaying advertisements in a content retrieval application. The computer-implemented method, system and computer program product include receiving a request to view content retrieved from source content containing one or more advertisements. The computer-implemented method, system and computer program product also include, responsive to receiving the request, initiating a timer configured to expire after a period of time has elapsed. Additionally, the computer-implemented method, system and computer program product include determining whether to display any of the one or more advertisements, based upon whether the timer has expired.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
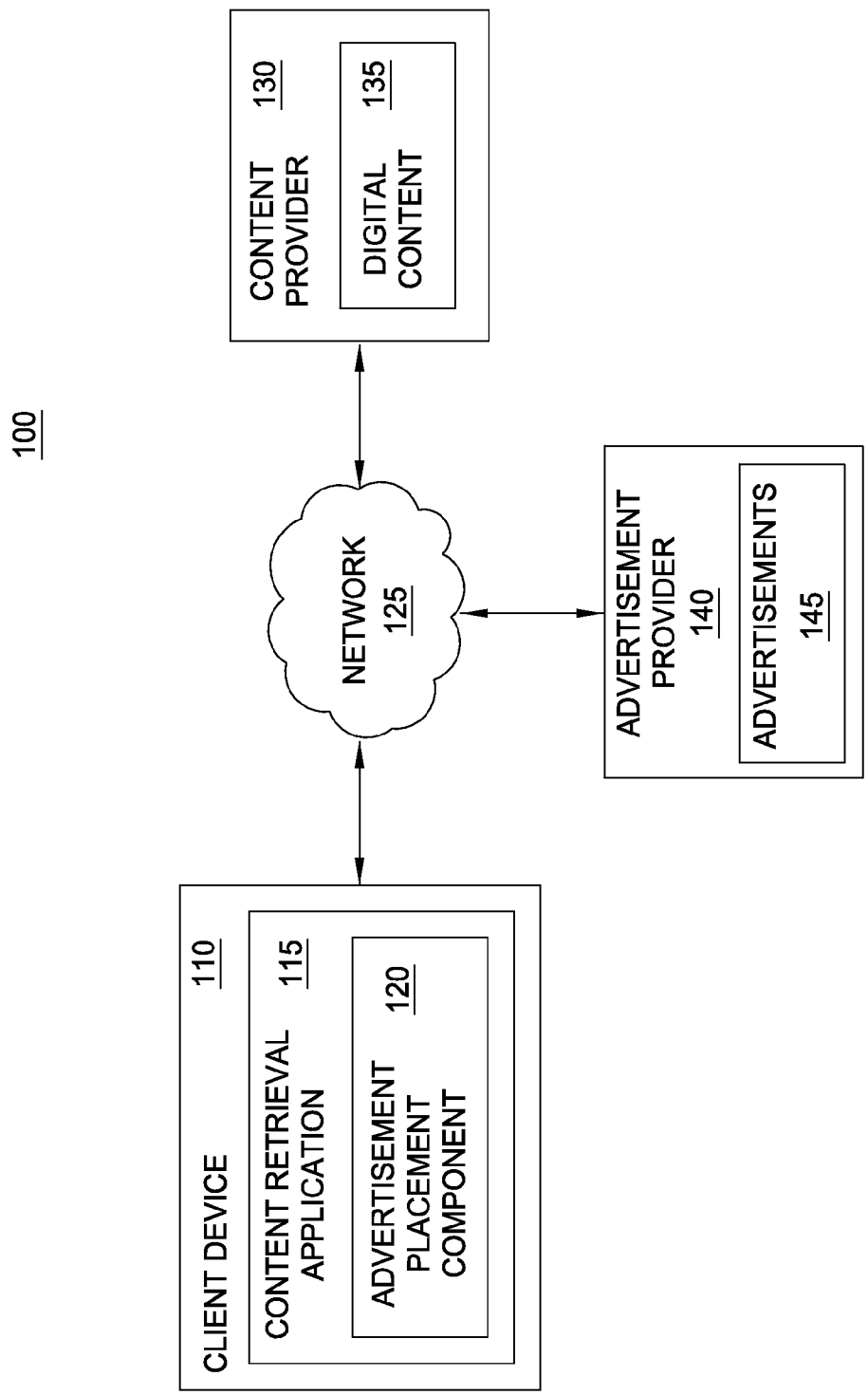
FIG. 1 is a block diagram illustrating a system configured to run an advertisement placement component, according to one embodiment presented in this disclosure.

Generally, content retrieval applications are software applications that allow users to tag remote content on a content server for subsequent local viewing. As an example, a content retrieval application could be used to mark online content (e.g., news articles) for subsequent viewing. The content retrieval application could then retrieve a copy of the marked content from the remote content server and make the local copy of the content available for subsequent viewing by the user. Such applications may be advantageous, for instance, on devices that do not have a consistent network connection. For instance, a mobile device that relies on WiFi connections for network connectivity may frequently move outside the range of any available WiFi networks. In such a scenario, a content retrieval application running on the mobile device could be used to store local copies of remote content when a WiFi connection is available, allowing such content to be viewed by users of the mobile device even when no network connection is available. As an example, a user could access a content retrieval application executing on a WiFi-equipped tablet PC to flag remote content items for retrieval over the user's home network connection before the user goes to work in the morning. Once at work, the user could then browse the previously-retrieved content using the content retrieval application, even when no network connection to the content provider is available (e.g., when no WiFi connection is available or when only a restricted WiFi connection is available).

Additionally, many content retrieval applications are configured to display the retrieved content without any of the advertisements that may be associated with the content. As defined herein, an advertisement refers to any marketing-related promotional content. Examples of such advertisements include, without limitation, marketing materials and/or promotional offers for brands (e.g., a particular manufacturer), products, services, discount offers, organizations and so on. Such advertisements may come in various forms. For instance, exemplary advertisements could be in the form of text, sounds, images, videos or combinations therebetween. In the context of the present disclosure, the user may use a content retrieval application to tag an online news article for retrieval from a web page that contains several advertisements. In such an example, the content retrieval application could be configured to retrieve the news article and to extract the advertisements from the accompanying article. While this allows the user to view ad-free content using the content retrieval application, it also effectively deprives the content provider of any advertising revenue that would have been gained from the user viewing the news article by ordinary means (e.g., accessing the news article through a web browser). For instance, certain content retrieval applications may not register a page hit with the web server providing the news article when retrieving the article from the content provider. In a revenue sharing system where the content provider is paid by the provider of the advertisements based on page hits, the content provider may not receive any revenue when the article is retrieved by the content retrieval application. Additionally, in some circumstances, the content provider may be paid based on users accessing the advertisements and/or purchasing goods and services after accessing the advertisements. However, since certain content retrieval applications may avoid retrieving advertisements along with the requested content, these advertisements may never be displayed to users of the content retrieval applications. As a result, the user is never able to access the advertisements and the content provider has no chance of collecting any access-based advertising revenue for the user.

Generally embodiments of the invention provide techniques for determining whether to display advertisements in a content retrieval application. Embodiments receive a request to view content retrieved from source content containing one or more advertisements. For instance, a user could access a graphical user interface of the content retrieval application and select one or more instances of source content to be retrieved. In response to the request, a timer may be initiated. Such a timer is configured to expire after a period of time has elapsed. For instance, the timer could be configured to run for a predetermined period of time. In one embodiment, the timer is determined dynamically based on behavioral patterns for the user of the content retrieval application.

Once the timer has been initiated, embodiments determine whether to display any of the one or more advertisements based upon whether the timer has expired. For instance, in one embodiment, the content retrieval application is configured to display advertisements along with the retrieved content if the timer has expired, and is further configured not to display advertisements when displaying the retrieved content if the timer has not expired. Such an embodiment may be preferable, for instance, when the content provider wishes to promote its most recent content while collecting additional revenues for archived content. In another embodiment, the content retrieval application is configured not to display advertisements along with the retrieved content if the timer has expired, and is further configured to display advertisements when displaying the retrieved content if the timer has not yet expired. This embodiment may be preferable, for instance, when the content provider wishes to capitalize on increased demand for its most recent content. For example, viewers may value current news articles more than articles that were written several weeks ago. As a result, a news organization may wish to collect advertising revenue for its most recently published news articles, while allowing its archived articles to be viewed ad free. Of course, these examples are for illustrative purposes and are without limitation. Moreover, one of ordinary skill in the art will recognize that any duration and configuration of timer could be used in accordance with embodiments of the present invention.

FIG. 1 is a block diagram illustrating a system configured to run an advertisement placement component, according to one embodiment presented in this disclosure. As shown, the system 100 includes a client device 110, a content provider 130 and an advertisement provider 140 that are interconnected by a network 125. The client device contains a content retrieval application 115 configured with an advertisement placement component 120. As discussed above, the content retrieval application 115 is generally software that allows a user to specify remote content to be retrieved for localized viewing. For instance, one example of a content retrieval application 115 is Read It Later® by Read It Later, Inc. The advertisement placement component 120 is generally configured to display advertisements together with the content retrieved by the content retrieval application 115, based on whether a timer initiated when the content was retrieved has expired.

As shown, the content provider 130 contains digital content 135. The digital content 135 represents any content stored in digital form. Examples of such digital content include, without limitation, documents, electronic books, images, videos and so on. For instance, according to one embodiment of the invention, the content provider 130 could be an organization that maintains a website on which they publish daily news articles (i.e., one form of digital content 135). Generally, the content retrieval application 115 could allow a user to select particular instances of digital content 135 hosted by the content provider 130 and could then retrieve local copies of the selected instances of digital content 135 for subsequent viewing.

The content provider 130 may also retrieve advertisements 145 from the advertisement provider 140 to include with the digital content 135. Continuing the example above of an organization publishing news articles, the content provider 130 may retrieve the advertisements 145 from the advertisement provider 140 and may incorporate the advertisements 145 into its web pages hosting the digital content 135. Typically, the content provider 130 receives advertising revenue from the advertisement provider 140 in exchange for including the advertisements 145 along with the digital content 135. This advertising revenue may enable the content provider 130 to offer the digital content 135 to members of the public for a reduced cost or even no cost at all.

However, as discussed above, certain content retrieval applications 115 are configured to extract the digital content 135 from the content provider 130 separate from the corresponding advertisements 145. While this may be preferable for users of the content retrieval application 115 that do not wish to view the advertisements 145, the content provider 130 may be unable to collect advertising revenue from such a transaction, as the advertisements 145 are never displayed to the user viewing the digital content 135. This is particularly true when the content provider 130 operates under an advertising revenue scheme that pays the content provider 130 for each time a user accesses an advertisement 145 (e.g., when a user clicks on an advertisement banner on a web page), as the user cannot access advertisements that are not displayed.

As such, the advertisement placement component 120 is configured to determine whether to display advertisements 145 when a user is viewing the retrieved local copies of the digital content 135 using the content retrieval application 115. More specifically, the advertisement placement component 120 may initiate a timer when the content retrieval application 115 retrieves the digital content 135. In one embodiment, the advertisement placement component 120 is configured to retrieve the advertisements 145 corresponding to the retrieved digital content 135 as well. When a subsequent request is received to view the retrieved content, the advertisement placement component 120 determines whether to display the advertisements 145 along with the retrieved content, based on whether the initiated timer has expired. For example, the advertisement placement component 120 could be configured to display advertisements 145 with content that was retrieved in the last 72 hours, but to not display any advertisements 145 for older content. Doing so allows advertisements to be selectively displayed based on when the content was retrieved.

Additionally, the advertisement placement component 120 may be configured to report out when the advertisements 145 are displayed by the content retrieval application 115, so that the content provider 130 may collect advertising revenue for the advertisements. For instance, in one embodiment, the advertisement placement component 120 may transmit a message when one of the advertisements 145 is displayed by the content retrieval application 115, effectively registering a page hit for a web page from which the digital content 135 was retrieved. The advertisement placement component 120 could be configured to transmit such a message to, for instance, the content provider 130 or the advertisement provider. In the case where the message is transmitted to the advertisement provider 140, the message could further identify the content provider 130 from which the content and the advertisement were retrieved. In one embodiment, the advertisement placement component 120 is configured to submit a database query indicating that the advertisement was displayed to a database. Such a database could be maintained by, for example, the content provider 130 or the advertisement provider 140. In the event that the database is maintained by the advertisement provider 140, such a query could identify the content provider 130 in addition to the advertisement displayed. Advantageously, doing so allows the content provider 130 to receive its share of advertising revenue for the digital content 135, even when the content is retrieved by the content retrieval application 115.

As certain users may prefer to see no advertisements at all when viewing the content retrieved by the content retrieval application 115, the content retrieval application provider may not wish to incorporate the advertisement placement component 120 into the content retrieval application 115 without some personal benefit. As such, according to one embodiment of the invention, the content retrieval application provider may collect a share of the advertising revenue. For instance, when reporting that an advertisement was displayed (e.g., by transmitting a message or submitting a database query), the advertisement placement component 120 could be configured to further specify an identifier of the content retrieval application 115 that displayed the advertisement. The advertisement provider 140 and/or the content provider 130 could then divert a portion of the advertising revenue paid to the content provider 130 for displaying the advertisement to the provider of the content retrieval application. Advantageously, doing so encourages the provider of the content retrieval application 115 to incorporate the advertisement placement component 120 while ensuring that the content provider 130 still receives advertising revenue for the digital content 135 viewed using the content retrieval application 115.

Figure 2:
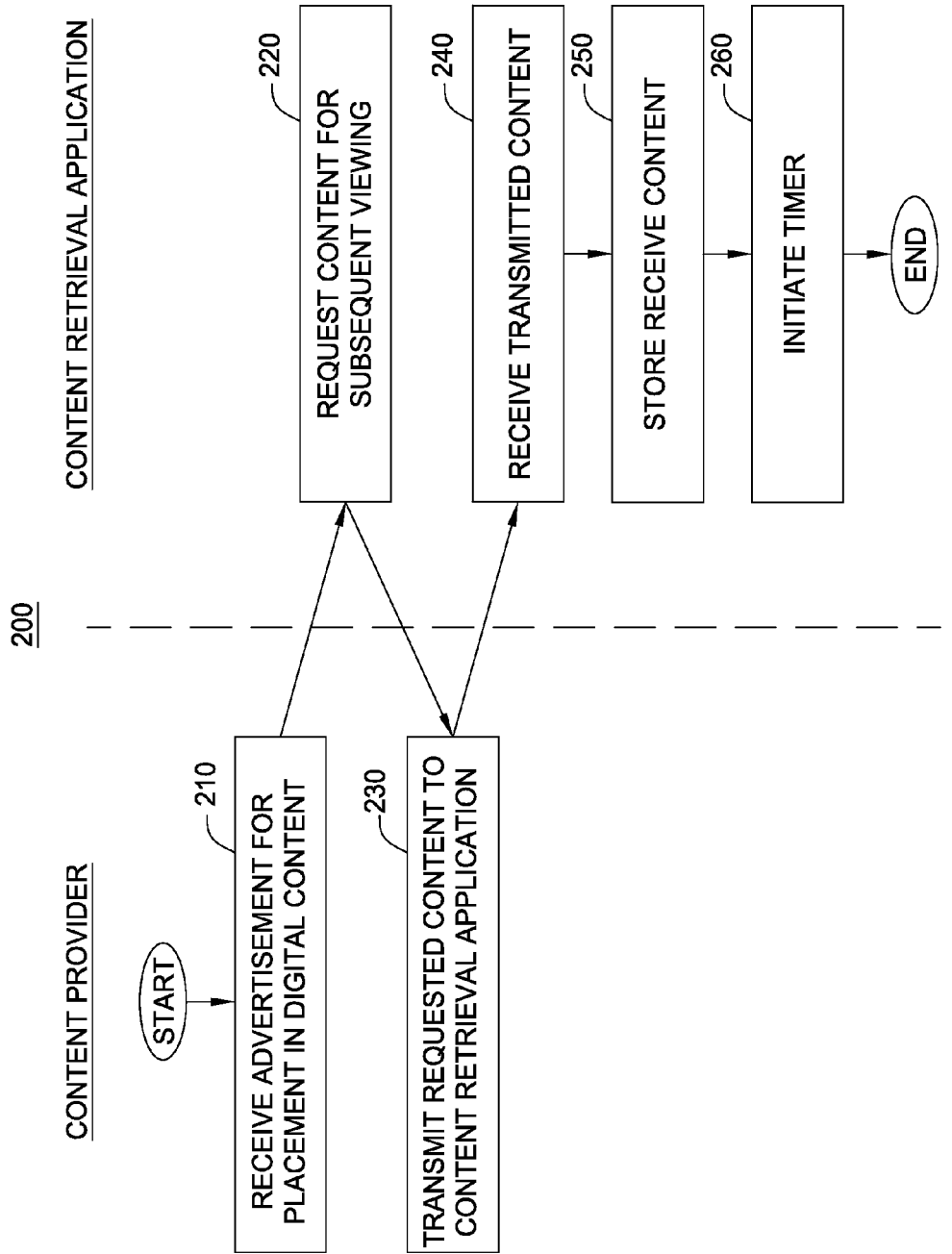
FIG. 2 is a flow diagram illustrating a method of retrieving content, according to one embodiment presented in this disclosure.

As discussed above, the advertisement placement component 120 may be configured to display advertisements based on how much time has elapsed since the content was retrieved by the content retrieval application 115. FIG. 2 is a flow diagram illustrating a method of retrieving content, according to one embodiment presented in this disclosure. As shown, the method 200 begins at step 210, where a content provider receives an advertisement for placement in digital content. In one embodiment, the content provider may itself retrieve the advertisement from an advertisement provider. Subsequently, a content retrieval application submits a request to retrieve the digital content (step 220). For example, an interface for the content retrieval application 115 could display a list of content that can be retrieved and allow the user to select or tag particular content for retrieval.

Responsive to receiving the request from the content retrieval application, the content provider transmits a copy of the requested content to the content retrieval application (step 230). For example, in one embodiment, the content provider transmits a web page containing the digital content to the content retrieval application. The content retrieval application then receives the requested content (step 240) and stores the received content for subsequent viewing (step 250). In one embodiment, the advertisement placement component 120 parses the received content to extract one or more advertisements from the content. The content retrieval application may then store the extracted advertisements separate from the received content. Doing so allows the content retrieval application to display the received content separate from the advertisements.

The content retrieval application then initiates a timer (step 260). Generally, once the timer is initiated, the timer is configured to expire after some period of time. In one embodiment, the timer is configured to expire after a predetermined period of time. For example, the timer could be set to expire 24 hours after initiated. In another embodiment, the advertisement placement component 120 is configured to dynamically determine the duration of the timer. For instance, the advertisement placement component 120 could determine the duration of the timer based on a source from which the content was retrieved. As an example, the advertisement placement component 120 could set the duration of the timer to 12 hours if the content was retrieved from a first content provider and could set the duration of the timer to 48 hours if the content was retrieved from a second content provider. Once the timer is initiated, the method 200 ends.

In one embodiment, the advertisement placement component 120 calculates the duration of the timer based on behavioral patterns of the user of the content retrieval application. In such an embodiment, the advertisement placement component 120 could monitor the user's behavior in order to collect user data for the user. The advertisement placement component 120 could then analyze the collected data to identify patterns in the user's behavior over a period of time. For example, a first user could always tag content for retrieval using the content retrieval application in the morning before going to work and the same user could then view the content at lunch the same day. In such an example, the content retrieval application could determine that the duration of the timer should be 6 hours, based on the identified patterns of user behavior. Doing so ensures that the timer captures the window of time in which the user frequently views the retrieved content.

In particular embodiments, the advertisement placement component 120 may calculate the duration of the timer based on additional factors. For instance, in lieu or (or in addition to) considering the behavioral patterns of the user, the advertisement placement component 120 could consider the user's personal information (e.g., the user's age or gender). As another example, the advertisement placement component 120 could be configured to calculate the duration of the timer based on whether the article is within an observed realm of interest for the user. That is, a particular user might frequently read articles on the subject of politics. Upon determining that a user has tagged a new article relating to politics, the advertisement placement component 120 could adjust the duration of the timer based on the user's historical preference for articles relating to the subject of politics. As another example, if the particular user then tags an article relating to cooking, the advertisement placement component 120 could use a different duration for the timer, based on the user's historical lack of interest in articles about cooking. Of course, these examples are provided without limitation and for illustrative purposes only. More generally, it is contemplated that the advertisement placement component 120 could adjust the duration of the timer (either to be longer or shorter) based on any number of factors consistent with the spirit and scope of the present disclosure.

Figure 3A:
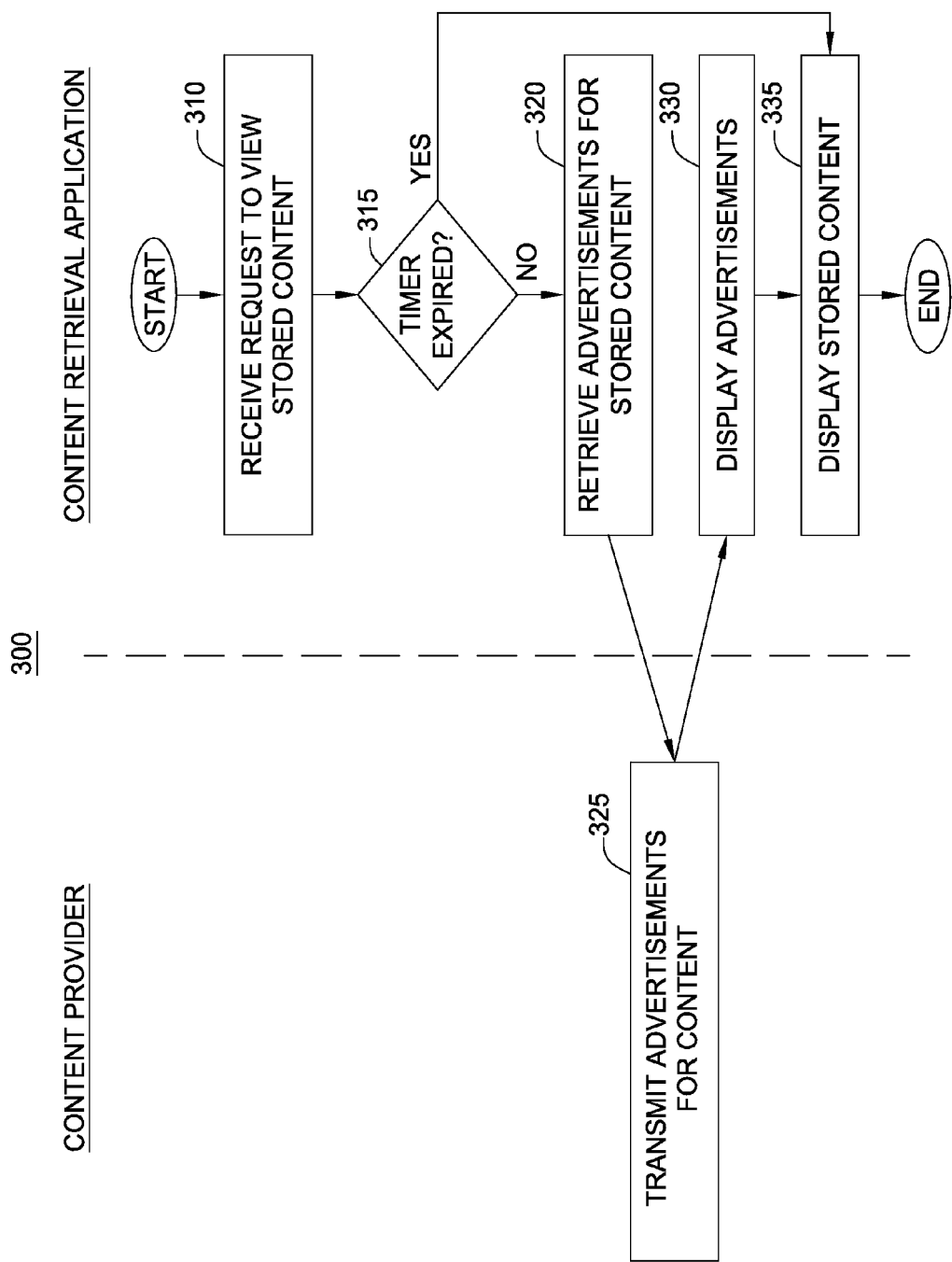
FIGS. 3A-B are flow diagrams illustrating methods for determining whether to display advertisements when displaying content, according to embodiments presented in this disclosure.
Figure 3B:
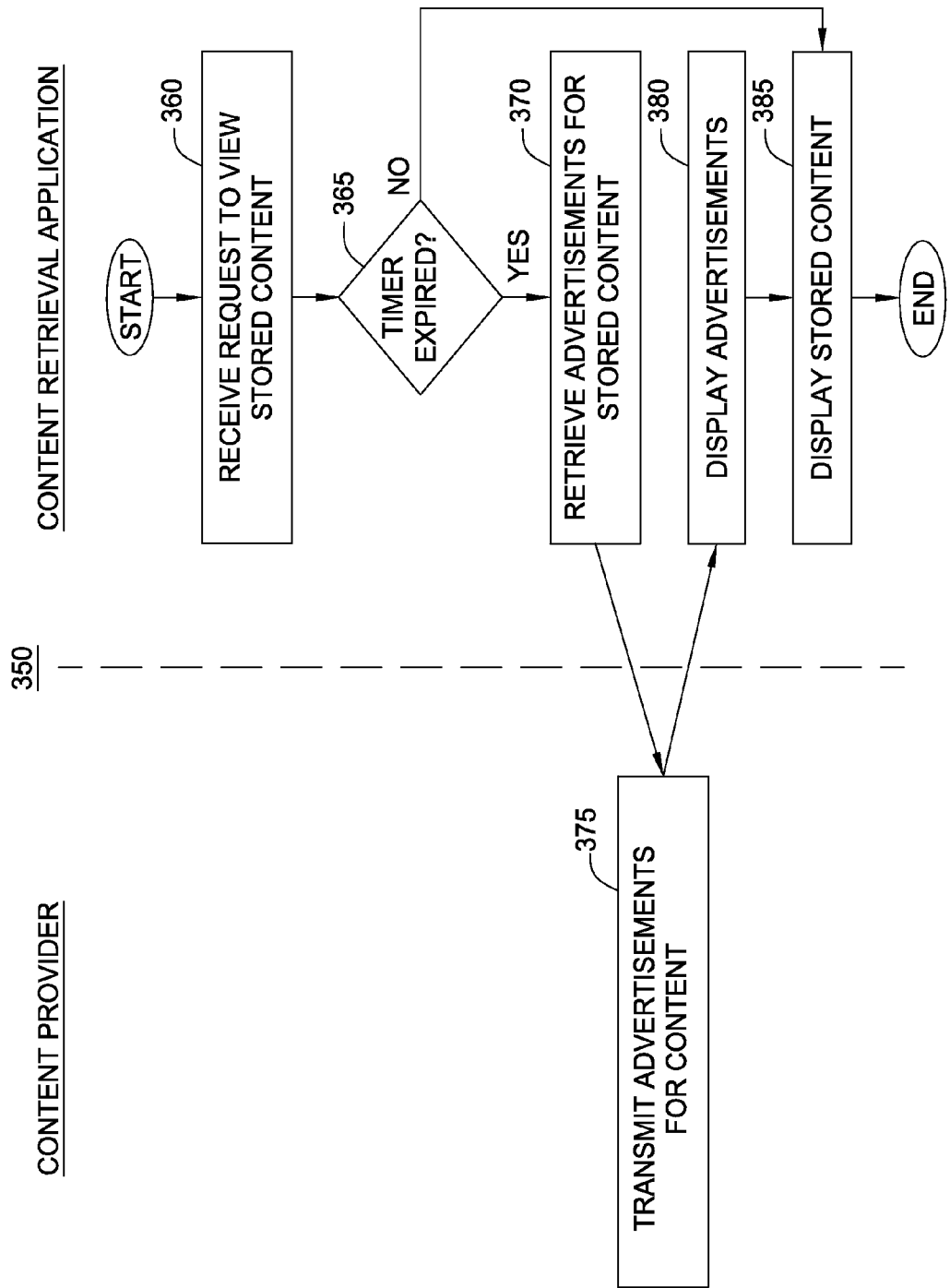

Generally, embodiments of the invention may determine whether to display advertisements along with the locally stored content based on whether the initiated timer has expired. For instance, in one embodiment, it may be advantageous to display advertisements along with the locally stored content, if the content has been recently stored on the device. As an example, users may be more interested in news articles that were recently released and describe recent news, but may be less interested in news articles that were published some time ago. FIGS. 3A-B are flow diagrams illustrating methods for determining whether to display advertisements when displaying content, according to embodiments presented in this disclosure. As shown, the method 300 shown in FIG. 3A begins at step 310, where the content retrieval application receives a request to view the locally stored content. Such stored content could have been retrieved, for example, using the method 200 depicted in FIG. 2 and discussed above. Upon receiving the request, the advertisement placement component 120 of the content retrieval application determines whether the timer has expired (step 315). In the depicted embodiment, if the advertising placement component 120 determines that the timer has expired, the content retrieval application displays the stored content (step 335) without displaying any advertisements and the method 300 ends. Thus, in the depicted method, the advertisement placement component 120 is configured to display advertisements for more recent content, while older content may be displayed ad free.

On the other hand, if the advertisement placement component 120 of the content retrieval application determines that the timer has not expired, the advertisement placement component 120 then transmits a request to retrieve one or more advertisements corresponding to the stored content from the content provider (step 320). Responsive to such a request, the content provider transmits the advertisements to the advertisement placement component 120 (step 325). Upon receiving the advertisements, the advertisement placement component 120 then displays the advertisements (step 330). The content retrieval application also displays the stored content (step 335) and the method 300 ends.

As discussed above, in particular embodiments, the advertisement placement component 120 is configured to not display advertisements for more recent content, while displaying advertisements for older content. Such an embodiment is depicted in FIG. 3B, which is a flow diagram illustrating a method for determining whether to display advertisements when displaying content, according to one embodiment presented in this disclosure. As shown, the method 350 begins at step 360, where a content retrieval application receives a request to view stored content (step 360). Such stored content could have been retrieved, for example, using the method 200 depicted in FIG. 2 and discussed above.

Upon receiving the request, the advertisement placement component 120 of the content retrieval application determines whether the timer has expired (step 365). As shown, if the advertising placement component 120 determines that the timer has not expired, the content retrieval application displays the stored content (step 385) without displaying any advertisements and the method 350 ends. Thus, in the depicted embodiment, the advertisement placement component 120 is configured to display advertisements for older content, while more recent content may be displayed ad free.

On the other hand, if the advertisement placement component 120 of the content retrieval application determines that the timer has expired, the advertisement placement component 120 then transmits a request to retrieve one or more advertisements corresponding to the stored content from the content provider (step 370). Responsive to such a request, the content provider transmits the advertisements to the advertisement placement component 120 (step 375). Upon receiving the advertisements, the advertisement placement component 120 then displays the advertisements (step 380). The content retrieval application also displays the stored content (step 385) and the method 300 ends. As such, embodiments of the invention may be configured to treat the expiration of the timer in various ways. In particular embodiments, the way in which the advertisement placement component 120 is configured to treat the expiration of the timer is based upon the nature of the content being retrieved. For example, the advertisement placement component 120 could be configured to use the method 300 shown in FIG. 3A for determining whether to display advertisements with a first type of content, and could be configured to use the method 350 shown in FIG. 3B for determining whether to display advertisements with a second type of content. Advantageously, this enables the advertisement placement component 120 to account for the type of content being retrieved and the preferences of the content provider in determining whether to display advertisements together with the retrieved content.

Figure 4:
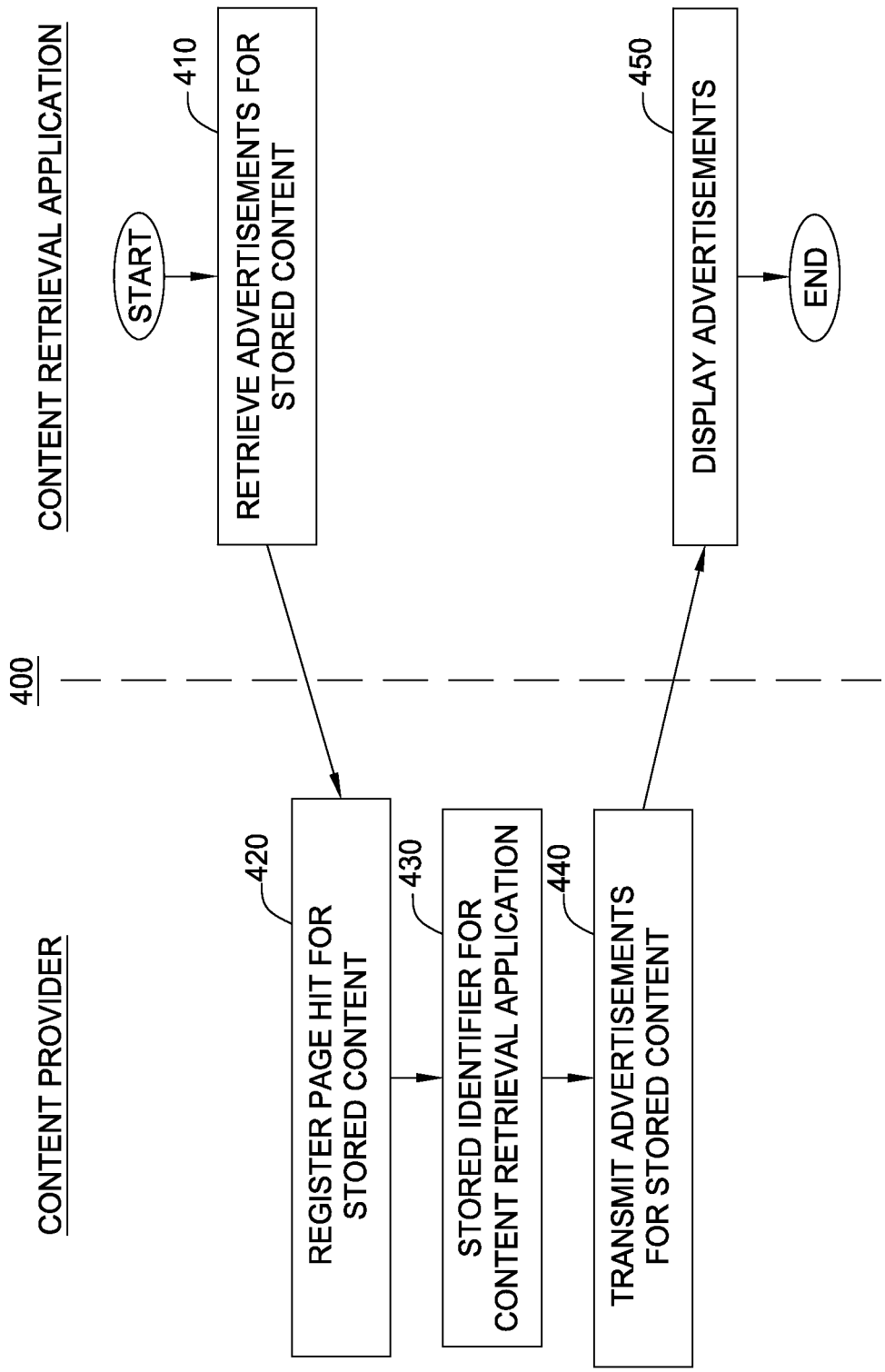
FIG. 4 is a flow diagram illustrating a method of displaying advertisements, according to one embodiment presented in this disclosure.

As discussed above, since some users may prefer that all content displayed by a content retrieval application to be displayed without advertisements, an advertising revenue sharing incentive may be offered to producers of content retrieval applications to incorporate an advertisement placement component 120 into their applications. Likewise, in order for the content provider to receive credit for the advertisements being displayed by the content retrieval application, the advertisement placement component 120 may report the display of the advertisements to the content provider and/or an advertisement provider. FIG. 4 is a flow diagram illustrating a method of displaying advertisements, according to one embodiment presented in this disclosure. As shown, the method 400 begins at step 410, where the content retrieval application submits a request to retrieve one or more advertisements corresponding to locally stored content (step 410). Such stored content could have been retrieved, for example, using the method 200 depicted in FIG. 2 and discussed above.

Upon receiving the request from the content retrieval application, the content provider registers a page hit for the stored content (step 420). In other words, in the depicted embodiment, the content provider increments a counter used for measuring how many times the advertisements have been viewed. Such a counter may be maintained by the content provider. In some embodiments, the content provider may report the page hit to the advertisement provider from which the advertisements were obtained. Additionally, because the content retrieval application producer collects a share of the advertising revenue in the depicted embodiment, the content provider stores an identifier for the content retrieval application (step 430). The identifier is generally any information that can be used to identify the content retrieval application or the producer of the content retrieval application. The identifier may then be used to determine which entity should receive a share of the advertising revenue for the retrieved advertisements.

The content provider then transmits the requested advertisements to the content retrieval application (step 440). Upon determining that the advertisements should be displayed together with the stored content based on whether an initiated timer has expired, the advertisement placement component 120 then displays the received advertisements (step 450) and the method 400 ends. Advantageously, the method 400 ensures that both the content provider and the content retrieval application producer receive their appropriate shares of the advertising revenue from displaying the advertisements.

Figure 5:
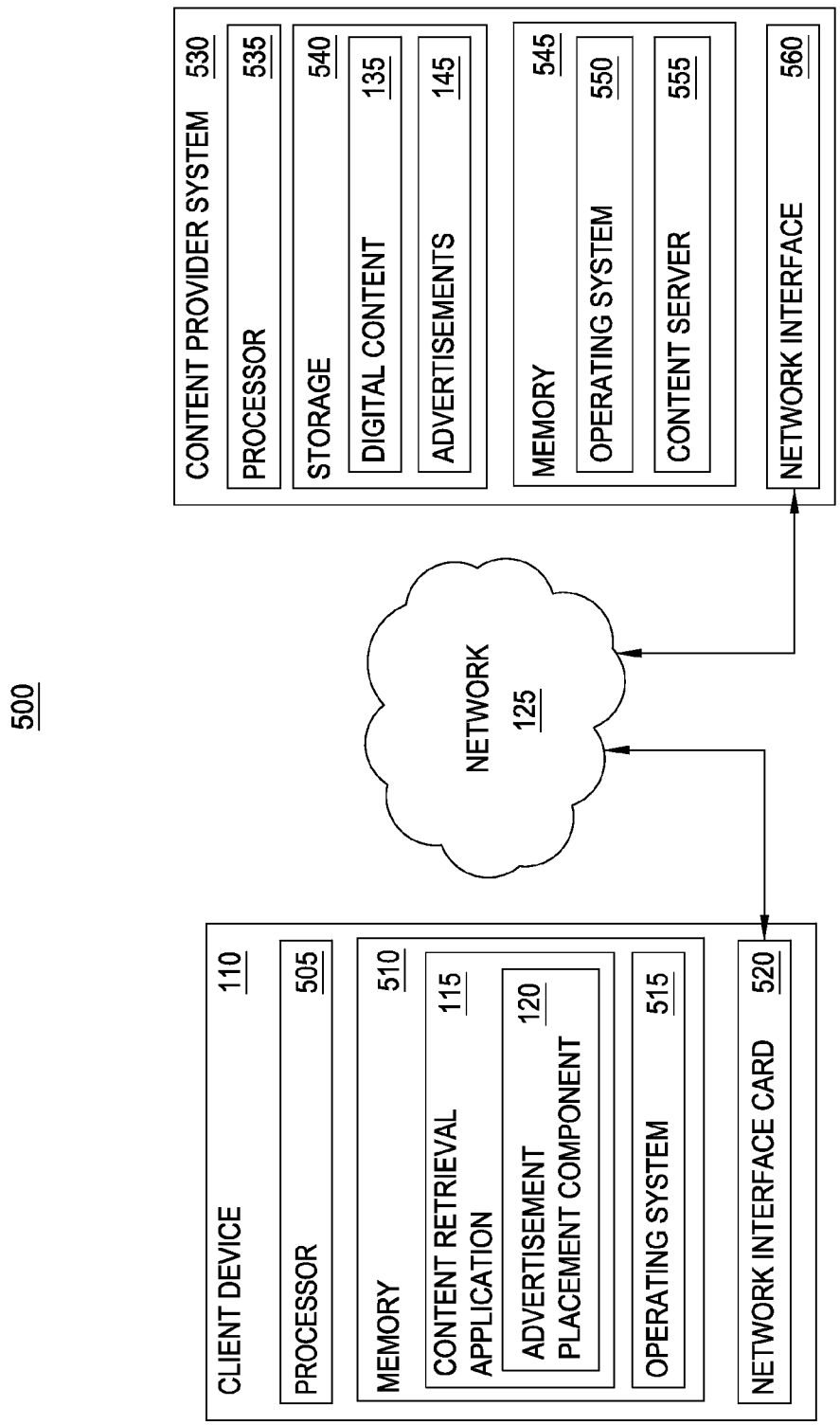
FIG. 5 is a block diagram illustrating a system configured to run an advertisement placement component, according to one embodiment presented in this disclosure.

FIG. 5 is a block diagram illustrating a system configured to run an advertisement placement component, according to one embodiment presented in this disclosure. As shown, the system 500 includes the client device 110 and a content provider system 530, communicatively coupled via the network 125. In one embodiment, the client device 110 may include existing computer systems, e.g., desktop computers, server computers, laptop computers, tablet computers, mobile devices (e.g., mobile phones), gaming consoles, handheld gaming devices and the like. The client device 110 illustrated in FIG. 5, however, is merely an example of one device in which embodiments of the present invention may be used. Embodiments of the present invention may be implemented differently, regardless of whether the computer systems are complex multi-user computing systems, such as a cluster of individual computers connected by a high-speed network, single-user workstations, or network appliances lacking non-volatile storage. Moreover, it is explicitly contemplated that embodiments of the invention may be implemented using any device or computer system capable of performing the functions described herein.

As shown, the client device 110 includes, without limitation, a processor 505, which obtains instructions and data via a bus from a memory 510. Processor 505 is a programmable logic device that performs instruction, logic, and mathematical processing, and may be representative of one or more CPUs. The client device 110 is operably connected to the network 125 via network interface 520. The memory 510 is any memory sufficiently large to hold the necessary programs and data structures. Memory 510 could be one or a combination of memory devices, including Random Access Memory, nonvolatile or backup memory (e.g., programmable or Flash memories, read-only memories, etc.). In addition, memory 510 may be considered to include memory physically located elsewhere; for example, on another computer coupled to the client device 110. The memory 510 includes an operating system ("OS") 515 and the advertisement placement component 120. Operating system 515 is software used for managing the operation of the client device 110. Examples of OS 515 include UNIX, versions of the Microsoft Windows® operating system and distributions of the Linux® operating system. (Note: Linux is a trademark of Linus Torvalds in the United States and other countries.) In particular embodiments, the OS 515 is an operating system designed for use on mobile devices. Examples of such an operating system include Android® OS and iPhone® OS. More generally, however, any operating system 640 capable of performing the functions described herein may be used.

Additionally, the client device 110 may be coupled to display devices and input devices (not shown). The display devices may include output devices such as monitors, touch screen displays, and so on. For instance, the display devices may include a display device used to visually depict an interface of the advertisement placement component 120. The input devices could represent a wide variety of input devices, including keyboards, mice, controllers, microphones, and so on.

As shown, the content provider system 530 includes, without limitation, a processor 535, which obtains instructions and data via a bus from a memory 545 and storage 540. Processor 535 is a programmable logic device that performs instruction, logic, and mathematical processing, and may be representative of one or more CPUs. Storage 540 is representative of hard-disk drives, flash memory devices, optical media and the like. Generally, the storage 540 stores application programs and data for use by the content provider system 530. As shown, storage 540 contains digital content 135 and advertisements 145. The digital content 135 generally represents any data objects stored in digital form. Examples of digital content 135 include, without limitation, textual content, image content, and so on. The content provider system 530 is operably connected to the network 135 via the network interface 560.

The memory 545 is any memory sufficiently large to hold the necessary programs and data structures. Memory 545 could be one or a combination of memory devices, including Random Access Memory, nonvolatile or backup memory (e.g., programmable or Flash memories, read-only memories, etc.). In addition, memory 545 and storage 540 may be considered to include memory physically located elsewhere; for example, on another computer coupled to the content provider system 530. The memory 545 includes an OS 550 and a content server application 555. Operating system 545 is software used for managing the operation of the content provider system 530. Examples of OS 545 include UNIX, versions of the Microsoft Windows® operating system and distributions of the Linux® operating system. More generally, any operating system 545 capable of performing the functions described herein may be used. Generally, the content server 555 represents any application capable of providing digital content that may be retrieved by the content retrieval application 115 on the client device 110. In one embodiment, the content server 555 represents a web server configured to provide web documents to applications on the client device 110.

As discussed above, the content retrieval application 115 may receive a request specifying one or more instances of remote digital content 135 to be retrieved. Responsive to such a request, the content retrieval application 115 could store a local copy of the specified content 135. Additionally, the advertisement placement component 120 could initiate a timer when the content is retrieved, where the timer configured to expire after a period of when the content is retrieved. Upon receiving a second request to view the local copy of the content, the content retrieval application 115 could display the local copy of the content. Additionally, the advertisement placement component 120 could determine whether to display advertisements along with the displayed content, based on whether the timer has expired.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user could tag content provided by a content server in the cloud for retrieval (e.g., using a content retrieval application 115 configured with an advertisement placement component 120 running on a client device). For example, a web server could execute on a computing system in the cloud and, responsive to a request from the content retrieval application 115, could return one or more web documents stored in the cloud. Upon receiving the web documents, the advertisement placement component 120 could initiate a timer configured to expire after a predetermined period of time. Upon receiving a request from a user to view the retrieved content, the advertisement placement component 120 could determine whether to display one or more advertisements, based on whether the timer has expired. Doing so allows advertisements to be intelligently displayed to users viewing content retrieved from any computing system attached to a network connected to the cloud (e.g., the Internet).

As another example, the content retrieval application 115 could reside on a computing system in the cloud and, responsive to a request from a user specifying one or more instances of digital content 135, could retrieve the specified instances of digital content and store the content at a storage location in the cloud. Additionally, upon retrieving the content, the advertisement placement component 120 could initiate a timer configured to expire after a period of time. Upon receiving a request to view the stored content, the advertisement placement component 120 could output the stored content for display and could determine whether to display advertisements together with the stored content, based on whether the timer has expired. Doing so allows advertisements to be selectively displayed to users viewing stored content from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of displaying advertisements in a content retrieval application executing on a client device, comprising:
   responsive to a request from a user to retrieve source content:
      downloading the source content from a remote server to a memory of the client device using a data communications network, wherein the source content includes one or more advertisements, and wherein the source content, once downloaded, is available for viewing locally on the client device without further communication between the client device and the remote server;
      modifying the retrieved source content to remove the one or more advertisements from the retrieved source content;
      storing the one or more advertisements separately from the modified source content within the memory of the client device; and
      initiating a timer configured to expire after a period of time has elapsed, wherein the period of time is dynamically determined based on historical times between receiving user requests to retrieve and corresponding requests to view source content on the client device;
   responsive to a second request to view the retrieved source content, and by operation of one or more computer processors:
      upon determining the timer has expired, outputting the source content with the one or more advertisements for display; and
      upon determining the timer has not expired, outputting the modified source content for display without the one or more advertisements.

2. The computer-implemented method of claim 1, further comprising:
   transmitting an electronic communication to a content provider of the source content specifying that the one or more advertisements were displayed.

3. The computer-implemented method of claim 2, wherein the electronic communication further includes an identifier of the content retrieval application, and wherein the identifier causes a revenue allocation event between an advertising provider from which the one or more advertisements were received and an organizational entity associated with the content retrieval application.

4. The computer-implemented method of claim 1, wherein the one or more advertisements include promotional materials relating to at least one of a good, a service, a brand of good, a brand of service or an organization.

5. A computer-implemented method, comprising:
   receiving a first request from a first user specifying source content containing one or more advertisements to be retrieved for localized viewing;
   downloading the source content from a remote server to a memory of the client device using a data communications network, wherein the source content includes one or more advertisements, and wherein the source content, once downloaded, is available for viewing locally on the client device without further communication between the client device and the remote server;
   modifying the retrieved source content to remove the one or more advertisements from the retrieved source content;
   storing the one or more advertisements separately from the modified source content within the memory of the client device;
   responsive to a second request to view the retrieved local copy of the source content, and by operation of one or more computer processors:
      upon determining that an amount of time since the local copy of the source content was retrieved exceeds a threshold amount of time, outputting both the modified source content and the one or more advertisements for display, wherein the amount of time is dynamically determined based on historical times between receiving user requests to retrieve and corresponding requests to view source content; and
      upon determining that the amount of time since the local copy of the source content was retrieved does not exceed the threshold amount of time:
         outputting the modified source content for display without the one or more advertisements.

6. The computer-implemented method of claim 1, wherein the data relating to the first user comprises data describing behavioral patterns of the first user, and wherein the period of time is dynamically determined based on an average time difference between when the first user historically requests to retrieve source content and when the first user historically requests to view the corresponding retrieved source content.

7. The computer-implemented method of claim 1, wherein the data relating to the first user comprises data describing preferences of the first user, and wherein the period of time is dynamically determined based on an estimation of how interested the first user is in the retrieved source content, based on a category of the retrieved source content and the data describing the preferences of the first user.

* * * * *